United States Patent

[11] 3,558,799

| [72] | Inventor | Asa Ren Lee<br>Cranford, N.J. |
|---|---|---|
| [21] | Appl. No. | 834,055 |
| [22] | Filed | June 17, 1969 |
| [45] | Patented | Jan. 26, 1971 |
| [73] | Assignee | Thomas & Betts Corporation<br>Elizabeth, N.J.<br>a corporation of New Jersey<br>Continuation-in-part of application Ser. No.<br>690,517, Dec. 14, 1967, now abandoned. |

[54] COUPLING
24 Claims, 7 Drawing Figs.

[52] U.S. Cl.................................................. 174/73,
29/421, 29/628, 174/84, 285/18, 285/294
[51] Int. Cl.................................................. H02g 3/00
[50] Field of Search............................................ 174/84,
84.1, 87, 88, 90, 94; 339/73, 276, 276E, 235E;
29/421, 516; 285/18, 382.2, 331, 294

[56] References Cited
UNITED STATES PATENTS

| 3,325,195 | 3/1967 | Margis.......................... | 29/421X |
|---|---|---|---|
| 3,429,587 | 2/1969 | Kish............................. | 29/421X |

FOREIGN PATENTS

| 217,400 | 10/1958 | Australia..................... | 339/276E |

*Primary Examiner*—Darrell L. Clay
*Attorney*—David Teschner

ABSTRACT: A coupling comprised of two concentrically mounted sleeves, the inner one of which can be deformed to grasp members placed therein. The two sleeves are sealed to one another adjacent their ends to form an enclosed space therebetween which is filled by a substantially noncompressible, resilient material and a substantially noncompressible material. The introduction of further noncompressible material, from an external source, through a port in the outer tube to the enclosed space causes deformation of the inner sleeve. Various insulators, corona shields and moisture seals complete the coupling assembly.

PATENTED JAN 26 1971 3,558,799

INVENTOR.
ASA REN LEE
BY
ATTORNEY

INVENTOR.
ASA REN LEE

ATTORNEY 3,558,799

COUPLING

CROSS REFERENCE TO RELATED APPLICATION

This is a continuation-in-part of copending application Ser. No. 690,517, filed Dec. 14, 1967, for a "Coupling" by Asa Ren Lee and assigned to the Assignee of the present application, now abandoned.

BACKGROUND OF THE INVENTION

1. Field of the Invention

The invention is directed to the field of transmission and distribution networks wherein large size conductors, carrying relatively high voltages and currents, are employed. These transmission and distribution networks may be overhead, that is affixed to towers, or other supporting structures, or may be found underground in cable vaults, or the like, or directly buried.

2. Description of the Prior Art

According to the teachings of the prior art, the joining of two large size conductors for transmission and distribution networks was specialized according to the area of application; that is, whether the transmission and distribution network was an overhead network or an underground network. In the overhead network uninsulated compression-type connectors are employed. This involves the use of hollow aluminum, steel, or similar metal connector sleeves constructed of a relatively malleable but high strength material. Conductors are inserted within the hollow sleeve and a large sized pneumatic staking tool is required in order to deform the sleeve about the conductors thereby retaining them therein. In that size and weight of the staking tools required, to deform the sleeve about the conductors, is great and the tools unwieldly and require a great deal of operating power, it is inconvenient to make connections in the line while it is suspended overhead. It is thus necessary to take the line off the supporting tower and make such connections at ground level. Emergency repairs and taps are cumbersome and difficult if the line cannot be removed from the supporting tower ad and must be repaired while still at tower height. Scaffolding, or other support means, must be erected adjacent to the point where the connection is to be made so that the heavy staking equipment can be positioned adjacent the conductors and the sleeve to be used for coupling the conductors.

For ground level, or underground cable runs, insulated splicers are required in order that there be shielding from dirt and moisture generally found in cable vaults and to electrically insulate the cable. This causes a far more involved problem. Firstly, a deformable metal sleeve is employed to couple the conductors, then the sleeve has to be insulated for protection against dirt, moisture and electrical stresses. After the cable is stripped, the stripped ends of the conductor are inserted within the malleable sleeve and heavy compression tools are required in order to stake the sleeve to the stripped conductors. This generally requires the movement of hydraulic power supplies, the crimping, or staking tools, heads and associated equipment down into the manhole, or cable vault, for such staking. After the connection of the cable to the sleeve is accomplished, a long procedure of building up an insulated tape splice is required. Such taping generally requires a long period of time for each one of the phases of a three-phase line. Further, the value of the splice cannot be determined until full load is applied to the conductors and until moisture is present within the vault. Pin holes, or other deformities, or structural weaknesses of the tape permit corona discharge and arcing which destroy the splice. Thus, splices made for underground use with prior art techniques are expensive, time consuming and uncertain.

SUMMARY OF THE INVENTION

The present invention overcomes the difficulties noted above with respect to prior art device conductor coupling devices and techniques by providing a coupling device which may be applied without the requirement for heavy crimping equipment and which will provide for underground use a fully insulated coupling which does not require the laborious and uncertain task of taping a splice once made. The invention, in its basic form, consists of an outer, hollow, cylindrical shell of rigid material. Mounted concentrically, and within said outer sleeve, is a hollow, deformable, cylindrical inner sleeve. A sleeve and ring is inserted between the outer surface of the inner sleeve adjacent its ends and the inner surface of the outer sleeve adjacent its ends, so as to form between the inner surface of the outer sleeve and the outer surface of the inner sleeve an enclosed space. Further, an antiextrusion ring is fitted at the ends of the outer sleeve adjacent the ends of the inner sleeve to prevent relative movement between the inner sleeve and the outer sleeve as the coupling is compressed about conductors to be joined. Further, placed adjacent the ends and within the inner sleeve are anticollapse rings to prevent the ends of the coupling from being deformed during the compression operation about conductors to be joined.

Within the enclosed space, between the inner and outer sleeves and partially filling the same, there is placed a layer of high dielectric elastomer tubing which is both noncompressible and resilient. Finally, the remainder of the enclosed space is filled with a noncompressible material such as a silicone resin material in its uncured, or unhardened, condition. A port, through the the outer sleeve to the enclosed space, permits the introduction of further noncompressible material under sufficient pressure to cause the deformance of the inner sleeve to grasp conductors placed therein. To achieve this, the inner sleeve is constructed of aluminum, or similar material, which is not heat treatable, and which can be deformed by the action of the con noncompressible, resilient material and the noncompressible material placed within the enclosed space. The outer sleeve constitutes a pressure sleeve and is made of a material which is nonyieldable such as a heat treatable aluminum, resin impregnated glass fibers or similar material, which will resist the effects of the compression operation.

Coupled to the outer surface of the outer sleeve at the ends thereof is a metallic, corona shield which may be joined to the conductors entering the coupling by means of end plates which have apertures therein to permit entry of the conductor and permit grasping of the stripped portions thereof. A stop member, placed within the central portion of the inner sleeve prevents prevents the overinsertion of the conductor within the inner sleeve permitting the coupling to grasp conductors inserted from both ends thereof equally. An outer, insulating jacket is placed atop the entire assembly, including inner and outer sleeves and the corona shield, and is covered by a layer of semiconductive material to act as an corona shield for the entire coupling. The semiconductive layer terminates in pads which are coupled to the semiconductive portions of a moisture seal placed about the conductors prior to entrance into the coupling. The seal provides a moisture seal for the entrances of the coupling. After compression of the coupling about the conductors a plug is placed in the port to form a completely sealed splice. It is therefore an object of this invention to provide an improved form of coupling device.

It is another object of this invention to provide an improved form of coupling device which can be coupled to conductors, or other members, without the necessity for a an external staking, crimping or compression tool.

It is another object of this invention to provide a self insulated coupling which can be coupled to conductors, or other members, without the requirements for external staking, crimping or compression equipment.

It is yet another object of this invention to provide an improved coupling device which can be operated by externally introduced noncompressive materials which coact with noncompressible materials and on noncompressible resilient materials previously stored within the coupling in itself.

It is still another object of this invention to provide an improved coupling device having a rigid outer sleeve and a deformable inner sleeve which inner sleeve can be deformed to seize conductors, or other members, placed within said inner sleeve.

It is another object of this invention to provide an improved coupling for coupling electrical conductors which provides a watertight, moisture tight and corona shielded coupling for such conductors.

It is yet another object of this invention to provide a coupling device whose inner sleeve is deformed to grasp conductors, or other members, placed therein by the agency of prestored, noncompressible material and a noncompressible resilient material which can be operated by the external introduction of additional quantities of such noncompressible material.

Other objects and features of the invention will be pointed out in the following description and claims and illustrated in the accompanying drawings, which disclose, by way of example, the principal of the invention and the best mode which has been contemplated for carrying it out.

BRIEF DESCRIPTION OF THE DRAWINGS

In the drawings in which similar elements are given similar reference characters.

DESCRIPTION OF PREFERRED EMBODIMENTS

Figure 1:
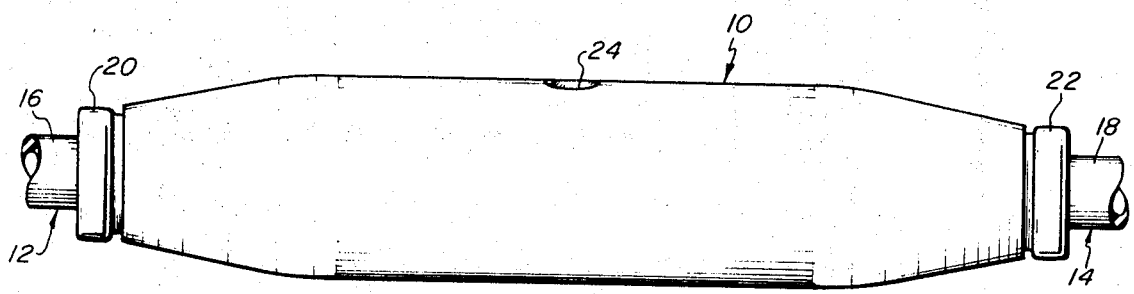
FIG. 1 is the side of an elevational elevation of a completed splice employing a coupling constructed in accordance with the concepts of the instant invention.

Turning now to FIG. 1 there is illustrated a splice employing a coupling 10, constructed in accordance with the concepts of the invention, to join conductors 12 and 14. Conductors of the type illustrated by the conductors 12 and 14 are arranged to carry high voltages and high currents and are provided with an external electrostatic shield in the form of a semiconductive layer; such as layers 16 and 18 for the conductors 12 and 14 respectively. Coupling 10 provides moisture seals 20 and 22 at its respective ends to prevent the introduction of moisture within the coupling 10 along the surfaces of the conductors 12 and 14 respectively. As will be described below, a port extends from the external surface of the coupling 10 to an enclosed space therein for the introduction of compressible material. The port is sealed by means of a plug such as 24 to provide a totally enclosed coupling 10. As will be described below the outer surface of the coupling 10 is also covered with a layer of semiconductive material and the plug 24 will similarly be coated with a semiconductive material in order that the external characteristics of the plug 24 match those of the coupling 10.

Figure 2:
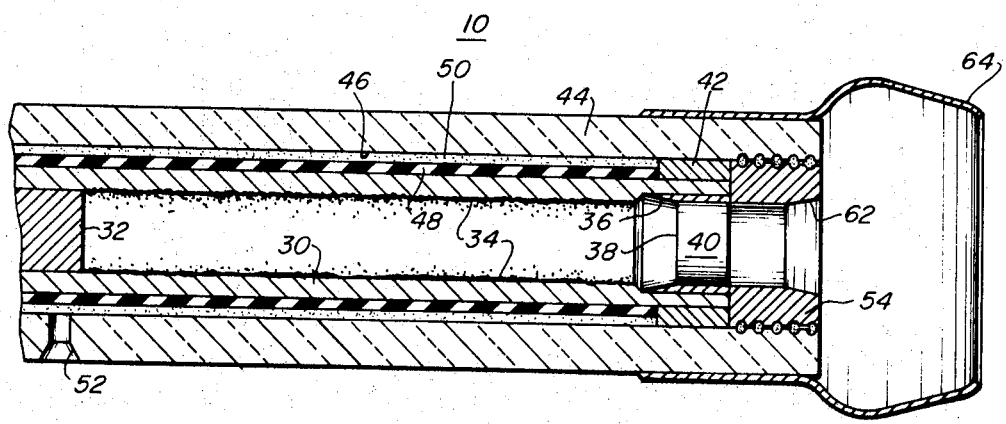
FIG. 2 is a side elevation, in section, showing a portion of the coupling constructed in accordance with the concepts of the invention.
Figure 4:
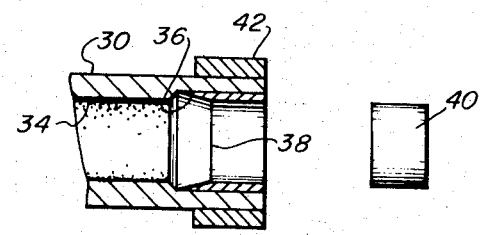
FIG. 4 is a side elevation, in section, showing details of the anticollapse ring of FIG. 2.

Turning now to FIG. 2 some of the details of the coupling 10 may be better appreciated. Coupling 10 comprises an inner sleeve 30 having a central stop 32 therein. Central stop 32 will prevent the overinsertion of the conductors conductors, such as 12 and 14 of FIG. 1, into the inner sleeve 30 and thus guarantee that there will be sufficient portions of each of the conductors therein to be grasped, by the inner sleeve, when deformed in a manner to be described below. The inner surface of the inner sleeve 30 is serrated as at 34 so that a sound mechanical coupling can be achieved between the inner sleeve 30 and the conductors placed therein. Further, the serrations 34 serve to break down an oxides which are formed on the outer portion of the conductors to assure a good electrical connection between the inner sleeve 30 and such conductor. The inner sleeve 30 is tapered as at 36 to provide a stop surface 38 for receipt thereagainst of a anticollapse ring 40 as is shown in more detail in FIG. 4 The end of the inner sleeve 30 is tapered from its widest portion remote from the end thereof to a narrower taper at the entry to the inner sleeve 30. Stop surface 38 will limit the insertion of the anticollapse ring 40 into the end of the inner sleeve 30. As will be described below, upon the collapsing, or deforming, of the inner sleeve 30, in order to seize conductors placed therein, anticollapse ring 40 will prevent the ends of the inner sleeve 30 from totally collapsing and thereby endangering the moisture seal and corona shielding provided by the overall coupling 10. Further, formed about the outer surface of the inner sleeve 30 is a sleeve end ring 42 which will also contact the inner surface of the outer sleeve sleeve 44 as is better shown in FIG. 2. The of outer sleeve 44 is placed atop ad and concentric with the inner sleeve 30 and separated therefrom by means of the sleeve end rings 42, only the right one of which is visable in FIG. 2. As can be seen from FIG. 2, the outer sleeve 44 extends beyond the inner sleeve 30.

As a result of the spacing apart of the outer sleeve 44 from the inner sleeve 30 means of the sleeve end rings 42 there will be created therebetween, that is, between the outer surface of the inner sleeve 30 and the inner surface of the outer sleeve 44 an enclosed space 46. As has been stated above, the outer sleeve 44 is constructed of a relatively rigid material and will serve as a pressure shield during the deformance of the inner sleeve sleeve 30 to hold conductors therein. The outer outer sleeve 44 may be constructed of heat-treatable aluminum, or any other suitable material, or may be fabricated from an insulating material such as resin impregnated glass fibers, in a cured state, such that it is hard and resists the influence of the pressure generated within the enclosed space 46. Placed within the enclosed space 46, partially filling the same, is a tubing of high dielectrical elastomer material 48. The material 48, noncompressible and resilient will, as described below, be deformed by means of further noncompressible material introduced into the enclosed space 46. Completing the filling of the enclosed space 46 is a noncompressible material such as uncured silicone resin material as at 50. The uncured silicone resin material or similar material, does not contain hardening agents and remains viscous and is noncompressible. A port 52 extends from the outer surface of the outer sleeve 44 to the enclosed space 46. The port 52 may have coupled to it a further source (not shown) of noncompressible material, such as uncured silicone resin material, which when introduced under pressure will cause the noncompressible material 50 to cause the deformation of the noncompressible, resilient material 48 and through their joint action cause compression and deformance of the inner sleeve 30 about conductors placed within the inner sleeve 30.

Figure 3:
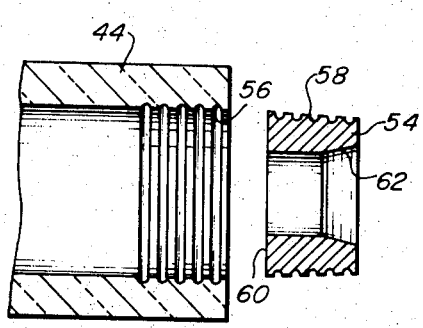
FIG. 3 is a side elevation, in section, and exploded to show the details of the antiextrusion ring of FIG. 2.

In order to prevent the relative movement of the inner sleeve 30 with respect to the outer sleeve 44, during compression or deformance of the inner sleeve 30, antiextrusion rings 54 are coupled to the overhanging portion of the outersleeve 44 and abut the inner sleeve 30. Only the ring 54 at the right-hand portion of coupling 10 is visible in FIG. 2. The details of this construction is better shown in FIG. 3. The ends of the outer sleeve 44, as is shown in FIG. 3, are serrated as at 56. Similarly, the outer surface of the antiextrusion ring 54 is serrated as at 58. Epoxy (not shown) may be placed in the serration 58 and then the entire antiextrusion ring 54, positioned in the end of the outer sleeve 44 permitting the epoxy to fill the serrations 56 of the outer sleeve 54 as well. After hardening, a bond will be formed between the antiextrusion ring 54 and the outer sleeve 44 preventing separation thereof. In that the surface 60 of the antiextrusion ring 54 will abut the end surfaces of the inner sleeve 30 displacement of the inner sleeve 30 with respect to the outer sleeve 44 will not be possible. The entry into the antiextrusion ring 54 is tapered as at 62 to aid in the easy insertion of the conductor, or other member, within within the inner sleeve 30 through the extrusion ring 54.

Coupled to the outer surface of the outer sleeve 44 is an corona shield 64 which extends beyond the end of the outer sleeve 44. The purpose of the corona shield 64 is to extend any charge which might exist within the entrance of the coupling 10 over the largest possible surface thereby decreasing the potential gradient which exists at any point and thereby decrease the likelihood of a corona discharge.

Figure 5:
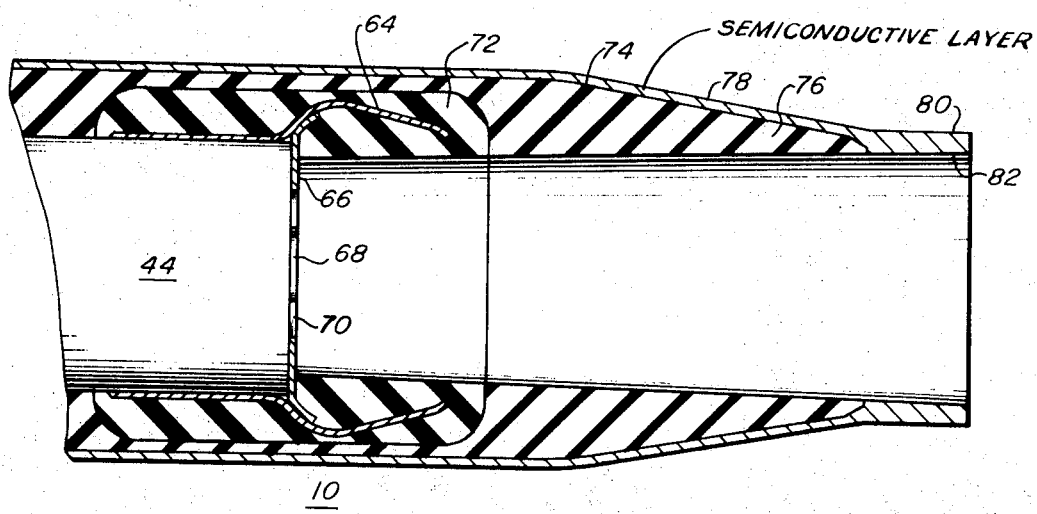
FIG. 5 is a side elevation, in section, showing details of the insulated jacket and corona shielding of the instant invention.
Figure 6:
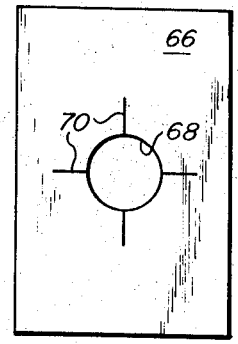
FIG. 6 is an end elevation of a portion of the corona shield of FIG. 5.

Turning now to FIGS. 5 and 6 the details of the insulators and the corona shield of the coupling 10 are set forth. An electrical coupling end plate 66 is provided partially blocking entry to the inside of the inner sleeve 30. As better seen in FIG. 6 the plate 66 has an aperture 68 therethrough and four radial scorings 70 radiating therefrom. Aperture 68 is intentionally chosen smaller than the diameter of the conductors to be joined such that when the conductor is forced through the aperture 68 the four segments of material bounding the aperture 68, separated by the scorings 70, permit the enlargement of the aperture 68 to permit the conductor to pass therethrough while at the same time causing the grasping of the conductors to insure contact between the electrical conductor and the end plate 66. The plate 66, as is shown in FIG. 5, is in contact with the corona shield 64 thereby assuring conduction of any surface charge on the conductors, placed within the coupling 10 will be transmitted to the corona shield 64.

Placed about the end of the outer sleeve 44 and the corona shield 64 is a first insulating boot 72. This serves to hold the corona shield 64 in its proper place during final insulation of the coupling 10. Placed atop the entire coupling comprised of the inner sleeve 30, the outer sleeve 44, the corona shield 64 and boot 72 is an insulating layer or outer jacket 74 of rubber or other suitable insulating material. The insulating layer 74 is tapered as at 76 to reduce the size of the overall coupling to approximately that of the diameter of the conductor to be joined and providing a smooth transition region to the maximum width of the coupling 10. Placed atop the insulating layer 74 is a semiconductive layer 78, which may be rubber with carbon black added, to provide an electrostatic shield for the entire coupling 10. Semiconductive layer 78 terminates in pads 80 which further have a semiconducting surface 82 extending into inner surface of the coupling 10 for purposes that will be described below with reference to FIG. 7.

Figure 7:
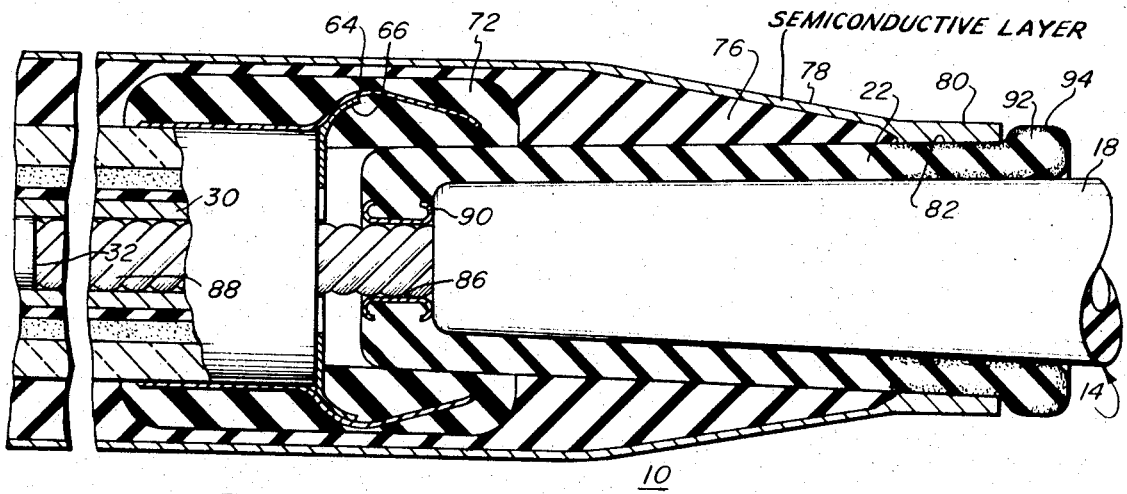
FIG. 7 is a side elevation, in section, of a portion of the coupling constructed in accordance with the concepts of the invention and showing the details of the insulating sleeve, the corona shielding and moisture seals for a conductor inserted within said coupling.

Turning now to FIG. 7, the assembly of the coupling 10 with a conductor 14 is shown. Prior to the coupling of the conductor 14, a portion of its outer insulation is stripped away to expose the bare metal conductor within. A moisture seal 22, in the form of a flexible resilient boot, is pulled onto the end of the conductor 14. Moisture seal 22 has therein an aperture 86 which permits the passage of the bare conductor portion 88 of conductor 14 therethrough into the inside of the inner sleeve 30. Also formed adjacent the aperture 86 of the moisture seal 84 is a split ring metal clip 90 used to hold the seal 22 in contact with the conductor bare portion 88 and prevent separation of the seal 22 from the conductor 14. At the opposite end of the moisture seal 22 is an outward extending annular shoulder 92 which has placed thereon a layer of semiconductive material 94. The entire conductor 14, with the moisture seal 22 in place, will now be inserted such that the bare portion of the conductor 88 will be fully inserted within the inner sleeve 30 until the end thereof contacts the stop member 4 32. As a result of the insertion of the bare portion 88 of the conductor 14 through the electrical coupling end plate 66 the aperture thereof 68 will be extended such that the segments about the aperture 68 grasp the bare portion 88 of the conductor 14 for a good electrical coupling between the end plate 66 and the cornoa shield 64. The semiconductive layer 94, on the shoulder 92, of the seal 22 will contact the layer of semiconducting material 82 on the pad 80 to insure a good electrical coupling therebetween. Further, the semiconductive material 94, of shoulder 92, will also be in contact with the semiconducting layer 18 on the outer portion of the conductor 14 to thereby assure the good electrostatic shield running from the conductor 14 through the shield 82 to the outer surface 78 of the coupling 10. It should be noted that the absence of any sharp corners provides for even distribution of the potential gradient and thus reduces the possiblity of corona discharge existing between the coupling 10 and nearby couplings or conductors.

When the conductors such as 12 and 14 have been positioned within the coupling 10 a source (not shown) of noncompressible material will be coupled to the port 52 as is shown in FIG. 2 and more noncompressible material 50 will be introduced into the enclosed portion 46 causing the deformance of both the noncompressible, resilient material

I claim:

1. A coupling for jointing a first member to a second member comprising: a rigid hollow outer member of a given length, having first and second ends, and a first predetermined transverse dimension; deformable, hollow, inner member of substantially said given length of said outer member having third and fourth ends and of a second predetermined transverse dimension, less than said first predetermined transverse dimension; said inner member positioned concentrically with and inside of said outer member to form a partially enclosed space between the outer surface of said inner member and the inner surface of said outer member along at least a portion of the outer surface of said inner member; means adjacent said third and fourth ends of said inner member to seal said inner member to said first and second ends of said outer member and seal said partially enclosed space; a layer of noncompressible resilient material about the outer surface of said inner member within and partially filling said enclosed space; a noncompressible material filling the remainder of said enclosed space; a port extending through said outer member to said enclosed space whereby the introduction of additional noncompressible material through said port deforms the material and resilient material in said enclosed space causing said inner member to deform securely seizing members placed within said inner member.

2. A coupling, as defined in claim 1, further comprising: anticollapse means placed within said inner member adjacent said third and fourth ends to prevent said third and fourth ends from collapsing when said inner member is deformed.

3. A coupling, as defined in claim 1, wherein the inner surface of said inner member is serrated to improve the coupling with members inserted therein.

4. A coupling, as defined in claim 1, further comprising a stop member within said inner member to limit the insertion of said first and second members into said inner member.

5. A coupling, as defined in claim 1, further comprising: port cover means for sealing said port.

6. A coupling, as defined in claim 1, further comprising: corona shields coupled to the outer surface of said outer member adjacent said first and second ends thereof.

7. A coupling, as defined in claim 6, further comprising: end plates coupled to said corona shields; said end plates each having an aperture therethrough aligned with the center of said inner member whereby said first and second members when inserted through said end plate apertures into said inner member are coupled to said corona shields.

8. A coupling, as defined in claim 1, further comprising: an insulating jacket placed about the outer surface of said outer member and extending beyond said first and second ends of said outer member.

9. A coupling, as defined in claim 8, further comprising: a layer of semiconductive shielding atop and extending beyond said insulating jacket; said semiconductive shielding terminating in pads adjacent the ends of said insulating jacket.

10. A coupling, as defined in claim 9, further comprising: moisture seals inserted into said inner member, one at each of said third and fourth ends, said moisture seals having apertures therethrough to permit the passage of either of said first or second members therethrough into said inner member.

11. A coupling, as defined in claim 10, wherein said moisture seal has a semiconductive layer on a portion of its outer surface; the semiconductive layer of said moisture seal contacting said pads of said semiconductive shield and the outer surface of either of said first or second members when said moisture seals are positioned about either said first or second members and within said coupling.

12. A coupling, as defined in claim 10, wherein said moisture seals have clips at one end thereof to grasp either said first or second member inserted therethrough and prevent separation thereof.

13. A coupling, as defined in claim 1, wherein said means adjacent said third and fourth ends of said inner member comprises sealing means for sealing said partially enclosed space and coupling means coupling said third and fourth ends of said inner member to said first and second ends of said outer member whereby relative movement between said inner and outer members is prevented.

14. A coupling, as defined in claim 13, further comprising: anticollapse means placed within said inner member adjacent said third and fourth ends to prevent said third and fourth ends from collapsing when said inner member is deformed.

15. A coupling, as defined in claim 13, wherein the inner surface of said inner member is serrated to improve the coupling with members inserted therein.

16. A coupling, as defined in claim 13, further comprising a stop member within said inner member to limit the insertion of said first and second members into said inner member.

17. A coupling, as defined in claim 13, further comprising; corona shields coupled to the outer surface of said outer member sa adjacent said first and second ends thereof.

18. A coupling, as defined in claim 17, s further comprising: end plates coupled to said corona shields; said end plates each having an aperture therethrough aligned with the center of said inner member whereby said first and second members when inserted through said end plate apertures into said inner member are coupled to said corona shields.

19. A coupling, as defined in claim 13, further comprising: port cover means for sealing said port.

20. A coupling, as defined in claim 13, further comprising: an insulating jacket placed about the outer surface of said outer member and extending beyond said first and second ends of said outer member.

21. A coupling, as defined in claim 20, further comprising: a layer of semiconductive shielding atop and extending beyond said insulating jacket; said semiconductive shielding terminating in pads adjacent the ends of said insulating jacket.

22. A coupling, as defined in claim 21, further comprising: moisture seals inserted into said inner member, one at each of said third and fourth ends; said moisture seals having apertures therethrough to permit the passage of either of said first or second members therethrough into said inner member.

23. A coupling, as defined in claim 22, wherein said moisture seal has a semiconductive layer on a portion of its outer surface; the semiconductive layer of said moisture seal contacting said pads of said semiconductive shield and the outer surface of either of said first or second members when said moisture seals are positioned about either said first or second members and within said coupling.

24. A coupling, as defined in claim 22, wherein said moisture seals have clips at one end thereof to grasp either said first or second member inserted therethrough and prevent separation thereof.